United States Patent [19]
Beck

[11] Patent Number: 5,857,665
[45] Date of Patent: Jan. 12, 1999

[54] SELF-PUMPING HYDROPNEUMATIC SHOCK ABSORBING STRUT WITH INTERNAL LEVEL REGULATION

[75] Inventor: Hubert Beck, Eitorf-Keuenhof, Germany

[73] Assignee: Fichtel & Sachs AG, Eitorf, Germany

[21] Appl. No.: 772,180

[22] Filed: Dec. 19, 1996

[30] Foreign Application Priority Data

Dec. 20, 1995 [DE] Germany .................. 195 47 535.6

[51] Int. Cl.$^6$ .................................................. F16F 9/46
[52] U.S. Cl. .................................. 267/64.17; 188/322.14
[58] Field of Search .................. 188/322.14; 267/64.17, 267/64.19

[56] References Cited

U.S. PATENT DOCUMENTS

| | | | |
|---|---|---|---|
| 3,729,784 | 5/1973 | Allinquant et al. | 267/64.17 |
| 4,469,315 | 9/1984 | Nicholls et al. | 267/64.17 |
| 4,577,840 | 3/1986 | Meller et al. | 267/64.17 |
| 5,464,079 | 11/1995 | Lohberg et al. | 188/322.14 |
| 5,564,680 | 10/1996 | Sand et al. | 267/64.17 |

FOREIGN PATENT DOCUMENTS

| | | | |
|---|---|---|---|
| 1430536 | 4/1969 | Germany . | |
| 2655817 | 6/1978 | Germany | 188/322.14 |
| 3630757 | 3/1988 | Germany | 267/64.17 |

*Primary Examiner*—Matthew C. Graham
*Attorney, Agent, or Firm*—Nils H. Ljungman and Associates

[57] ABSTRACT

Self-pumping hydropneumatic shock absorbing strut with internal level regulation, in particular for motor vehicles, with a work cylinder which is filled with oil, is under the pressure of at least one gas cushion which is located in at least one high pressure chamber and acts as a spring. The work cylinder is divided by a piston carried on a hollow piston rod into two work chambers, with a piston pump which is driven by the spring movements and transports oil from a low pressure chamber into the work chamber which is connected to the high pressure chamber. The pump cylinder of the piston pump is formed by the hollow piston rod. There are valves between the work chamber and the high pressure chamber for the decompression and compression damping, whereby as a valve, there is at least one valve plate, which interacts with a valve seat, which is located on the work cylinder.

14 Claims, 8 Drawing Sheets

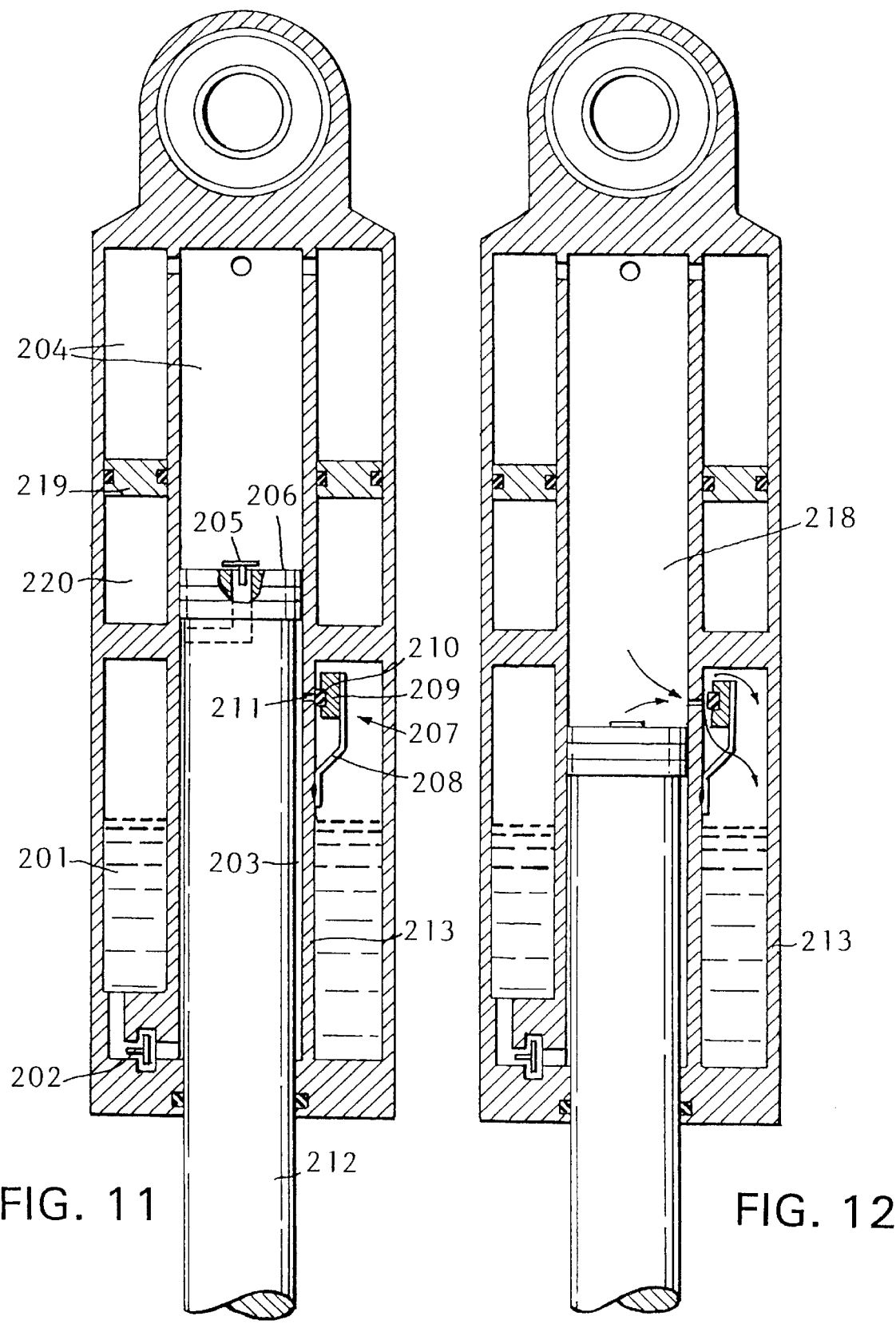

SELF-PUMPING HYDROPNEUMATIC SHOCK ABSORBING STRUT WITH INTERNAL LEVEL REGULATION

BACKGROUND OF THE INVENTION

1. Field of the Invention

This invention relates to a self-pumping hydropneumatic shock absorbing strut with internal level regulation, in particular for motor vehicles, with a work cylinder which is filled with oil and is under the pressure of at least one gas cushion which is located in at least one high pressure chamber and acts as a spring. The work cylinder is divided by a piston, which piston is carried on a hollow piston rod, into two work chambers, with a piston pump which is driven by the spring movements and transports oil from a low pressure chamber into the work chamber. The work chamber is connected to the high pressure chamber, and the pump cylinder of the piston pump is formed by the hollow piston rod, whereby there are valves between the work chamber and the high pressure chamber for the decompression and compression damping.

2. Background Information

In similar shock absorbing struts, as described in German Patent No. 14 30 536, for example, the piston which is fastened to a piston rod, divides the work cylinder into two work chambers, whereby the piston rod is realized so that it is hollow, thereby forming a piston pump, and a pump rod is inserted in the cavity of this piston rod. On the end surface of the work cylinder there is a solid base which holds the pump rod elastically, and whereby this base also contains damping valves for the decompression and compression damping. These valves are illustrated only schematically, without a more detailed illustration of the concrete construction or realization.

OBJECT OF THE INVENTION

The object of the invention is to create a structurally simple valve unit for the decompression and compression damping of a self-pumping hydropneumatic shock absorbing strut.

SUMMARY OF THE INVENTION

The invention teaches that this object can be accomplished if, as the valve, there is at least one valve plate which interfaces with a valve seat which is located on the work cylinder.

In one embodiment which is favorable from a manufacturing point of view, the valve plate can be supported radially inwardly on a second valve seat which can be located on a pump rod.

On self-pumping, hydropneumatic shock absorbing struts with internal level regulation in which a pump rod is not used, the invention teaches that the valve plate can be supported radially inward on a second valve seat, which second valve seat can be supported radially inwardly on a retaining element. The retaining element can be connected to the work cylinder, and straddles or bridges the work cylinder.

On the constructions described above, it can be advantageous that either the valve seat can be formed only between the valve plate and the work cylinder, in which case degressive characteristics can be achieved as a result of the large valve seat diameter, or also that a second radially inward valve seat can make possible an optimal damping both for the decompression damping and the compression damping.

To create not only a structurally simple damping valve, but also a structurally simple attachment of the pump rod, in an additional embodiment, the invention teaches that a pump rod, which pump rod is inserted in the pump cylinder, can be fixed in position by means of a retaining element, wherein the retaining element can be connected to the work cylinder and straddle the work cylinder.

A satisfactory flow connection between the work cylinder and the high pressure chamber can essentially be ensured by providing the retaining element with recesses.

A configuration of the valve seat which can be simple from a manufacturing point of view becomes possible if the valve seat is formed on the end surface of the work cylinder.

To appropriately vary the damping forces, in an additional embodiment the valve plates can be biased by means of a bracing element.

To achieve damping forces of different magnitudes as a function of the direction of flow, the invention teaches that in an additional embodiment, the valve seat and the second valve seat can each be realized for a single direction of flow. It is thereby advantageous that the valve plates each open in one direction and close the flow connection in the opposite direction. Such a capability can be achieved by corresponding stops for the valve plates.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Preferred embodiments of the invention are illustrated schematically in the accompanying drawings.

FIGS. 11 and 12 show a sectional view of another embodiment of a shock absorbing strut.

DESCRIPTION OF THE PREFERRED EMBODIMENT

Figure 1:
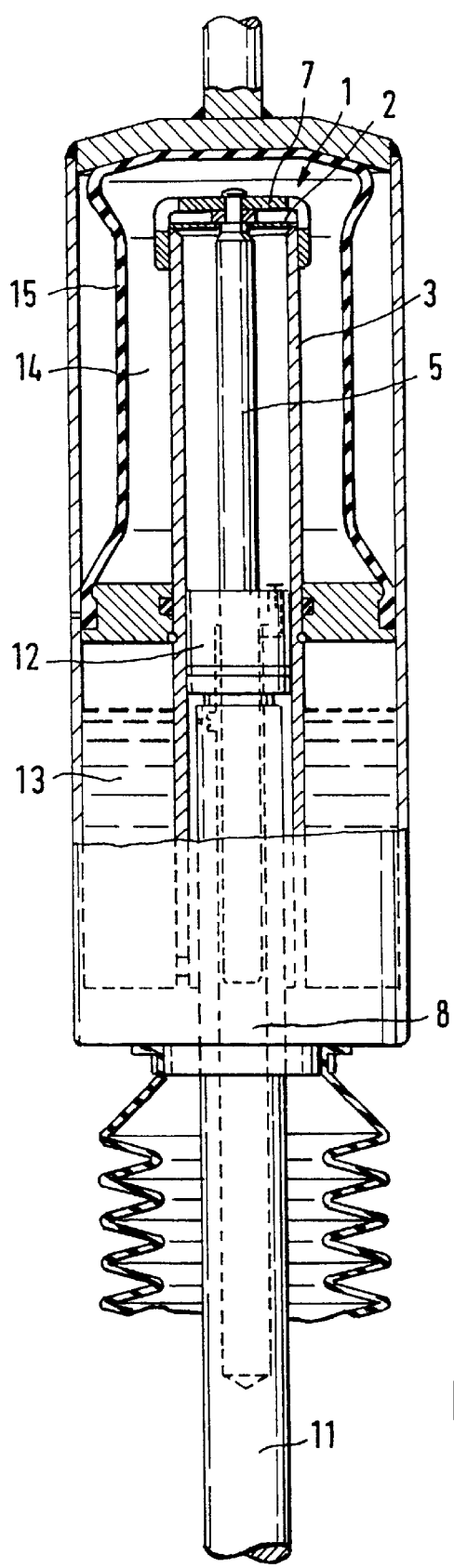
FIGS. 1, 1a and 1b each show a sectional view of a shock absorbing strut.
Figure 1A:
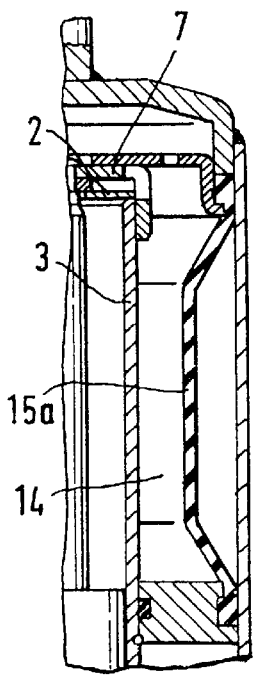
Figure 1B:
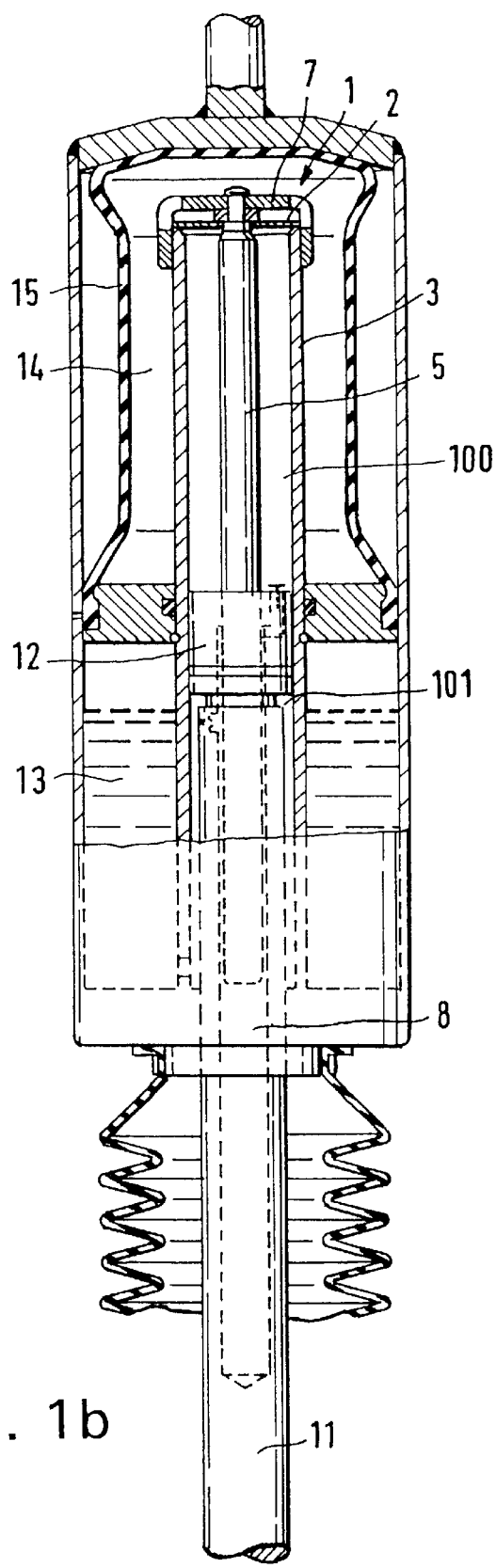

The self-pumping hydropneumatic shock absorbing strut illustrated in FIGS. 1 and 1b includes a work cylinder 3, which is divided into two work chambers 100; 101 by a piston 12 which is fastened to a piston rod 11. The work cylinder 3 is coaxially surrounded by a low pressure chamber 13 and a high pressure chamber 14. Gas and damping medium are introduced into the low pressure chamber 13, while the high pressure chamber 14 separates the damping medium from the gas volume by means of a membrane 15. Between the upper work chamber 100 of the work cylinder 13 and the high pressure chamber 14, a pump rod 5 is held by means of a retaining element 7, whereby the retaining element 7 simultaneously fixes the position of a valve 1, which valve includes a spring plate 2. The piston rod 11 is hollow, whereby the cavity therein represents a pump cylinder 8 into which the pump rod 5 can be inserted.

As a result of the in and out movements of the piston rod 11, damping medium is transported from the low pressure chamber 13, via the pump rod 5 in connection with the pump cylinder 8, into the high pressure chamber 14. The gas cushion on the reverse side of the membrane 15 is thereby compressed as a function of the load and acts as a gas spring. When the body of the vehicle has reached the specified level, the pumping process is neutralized, e.g. by means of a special shaping of the pump rod 5. The damping in the decompression and compression stage for the vehicle is accomplished by the valve 1.

In accordance with one possible embodiment of the present invention (not shown), the pump rod 5 can be shaped such that the end of the pump rod 5 which enters the pump cylinder 8 can be tapered so as to have a smaller diameter at that end. In another possible embodiment (not shown) the pump rod 5 can have a cut away section in the end entering the pump cylinder 8.

The membrane 15 illustrated in FIG. 1 is a one-piece membrane, while in FIG. 1a, the retaining element 7 has been radially widened and encloses a ring-shaped membrane 15a. The membrane 15a illustrated in FIG. 1a is thereby provided on each end surface with a fastening bead which is used simultaneously to seal the gas chamber with respect to the high pressure chamber 14. Otherwise, the function of the shock absorbing strut illustrated in FIG. 1a is comparable to the action of the shock absorbing strut illustrated in FIG. 1.

The internal level regulation of the shock absorbing strut can be accomplished with structure which can be included into the piston 12 and the work cylinder 3. An example of a structure which can be incorporated to accomplish this function can be seen in FIG. 1 of U.S. patent application Ser. No. 08/761,358, filed with the U.S. Patent and Trademark Office on or about Dec. 6, 1996, having the inventor Hubert Beck and having the attorney docket number NHL-FIS-236.

Figure 2:
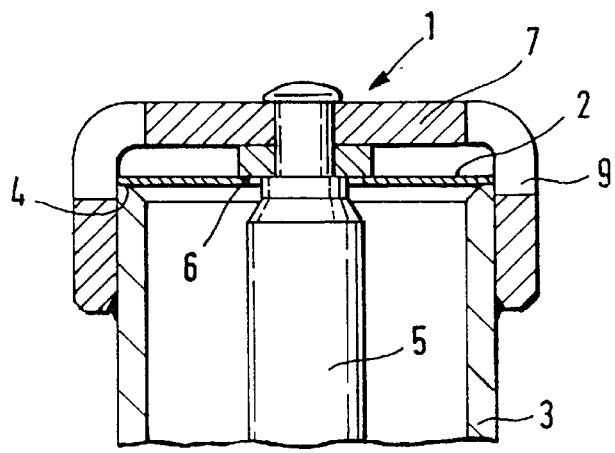
FIGS. 2 and 3 show details of a valve.
Figure 3:
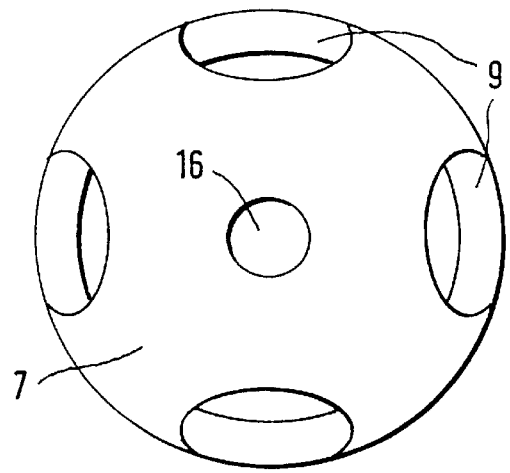

FIG. 2 shows a detail of a valve 1, in which the work cylinder 3 carries the retaining element 7, whereby as shown in FIG. 3, the retaining element 7 is provided on one hand with recesses 9 for the flow connection from the work chamber 100 into the high pressure chamber 14, and whereby a boring 16 is used to locate the pump rod 5. FIG. 2 also shows that the valve plate 2 is enclosed radially inward between the end surface of the work cylinder 3 and the retaining element 7 on the one hand, and the pump rod 5 and the retaining element 7, on the other hand. The end surface of the work cylinder 3 thereby forms a radially outer valve seat 4, while a second valve seat 6 is provided radially inward in the vicinity of the pump rod 5.

Figure 4:
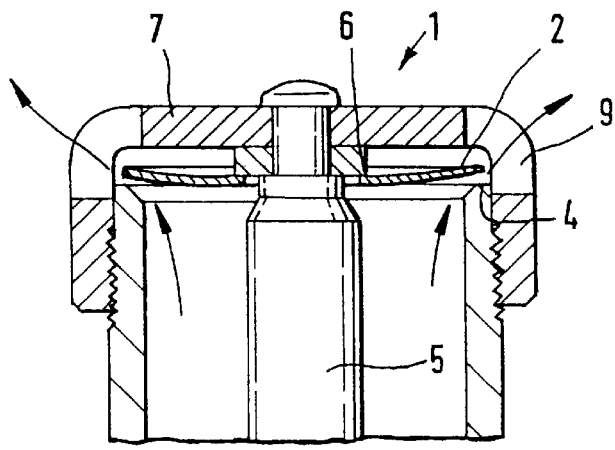
FIGS. 4 and 5 illustrate the function of the valve illustrated in FIG. 2 in the decompression and compression directions.

The function of the compression stage is illustrated in FIG. 4, in which when the piston 12 is inserted, the spring plate 2 opens the valve seat 4 radially outwardly, and makes possible a flow connection from the upper work chamber 100, past the valve seat 4, through the recesses 9 into the high pressure chamber 14. The valve seat 6 located radially inwardly is thereby correctly closed by the elevated internal pressure in the work chamber 100.

Figure 5:
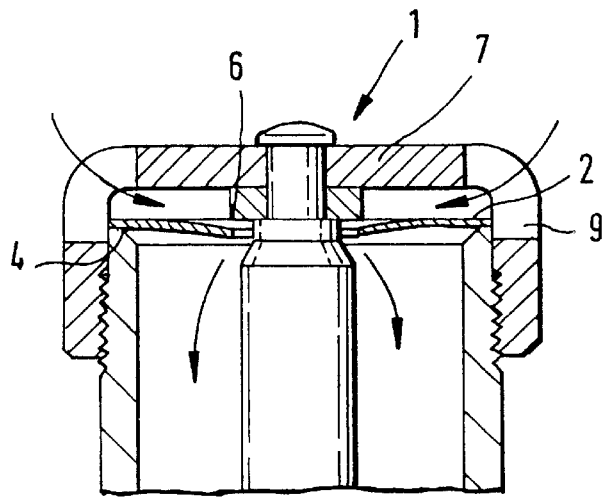

In the decompression stage, on the other hand, i.e. when the piston 12 is being extended, the damping medium, as illustrated in FIG. 5, moves from the high pressure chamber 14 through the recesses 9, past the second valve seat 6 and into the work chamber 100. As a result of the corresponding pressure on the valve plate 2, the valve seat 4 is closed radially outwardly. The thickness, number and bias of the valve plate or plates 2 are decisive in determining the level and characteristic of the damping force. As a result of the pressurization by the damping medium over a wide area, even sharply degressive characteristics can be achieved without problems. The ratio of decompression to compression damping is determined primarily by the inside and outside diameter of the valve plate 2.

Figure 6:
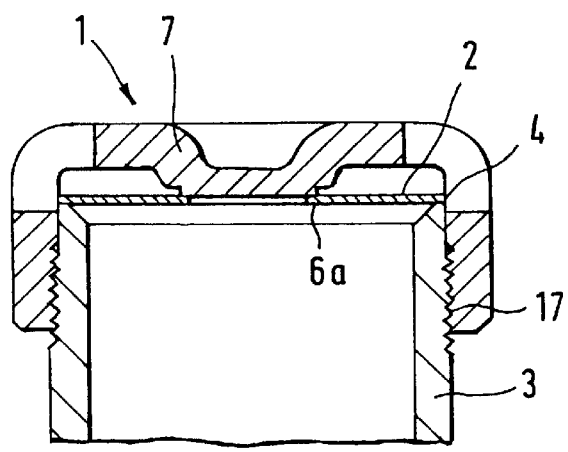
FIGS. 6 to 8 illustrate additional embodiments of a valve when used in a shock absorbing strut without a pump rod.
Figure 7:
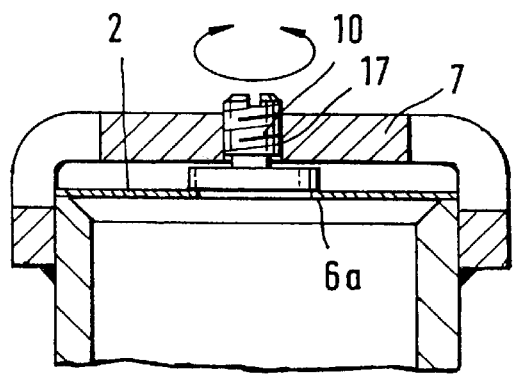
Figure 8:
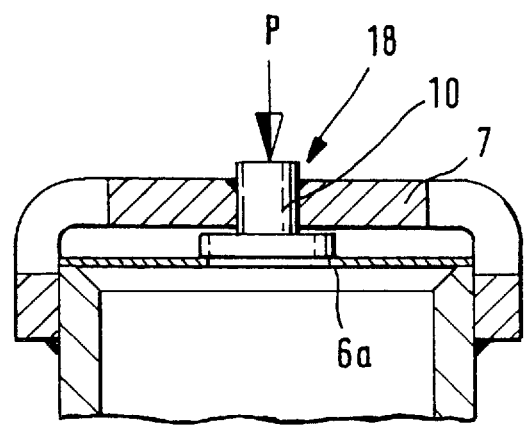

FIGS. 6 to 8 illustrate embodiments of valves 1 in which the shock absorbing strut is realized without a pump rod. In that case, the work cylinder 3 forms the valve seat 4 together with the valve plate 2, while the valve plate 2 radially inwardly forms the second valve seat 6a together with the retaining element 7. A bias can be applied to the valve plate 2 by means of a corresponding threaded connection 17.

In FIG. 7, this bias can be applied to the valve plate 2 by means of a bracing element 10 and a corresponding threaded connection 17 between the bracing element 10 and the retaining element 7.

FIG. 8 is largely similar to the embodiment illustrated in FIG. 7, with the distinction that the bracing element 10 can be fixed in place, after the application of an appropriate force P, by means of a laser weld 18.

Figure 9:
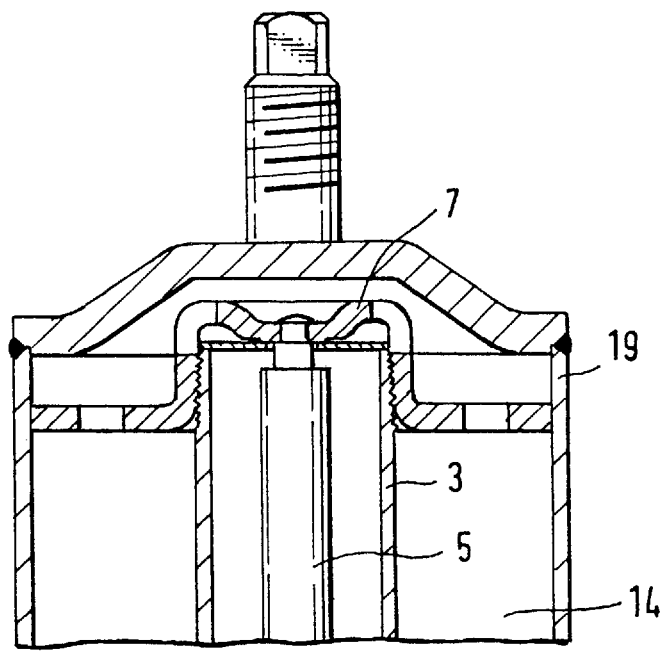
FIG. 9 shows, in a sectional view, a reinforced embodiment of a shock absorbing strut for struts which control the wheels.

FIG. 9 also shows a shock absorbing strut which includes the work cylinder 3, the pump rod 5 and the high pressure chamber 14, and is realized in the form of a shock absorbing strut which is used to guide the wheel. For this purpose, the retaining element 7 is extended radially outward so that the corresponding support forces between the work cylinder 3 and the outer tube 19 can be absorbed. In accordance with one embodiment, the retaining element 7 can extend radially outwardly up to the outer tube 19.

Figure 10:
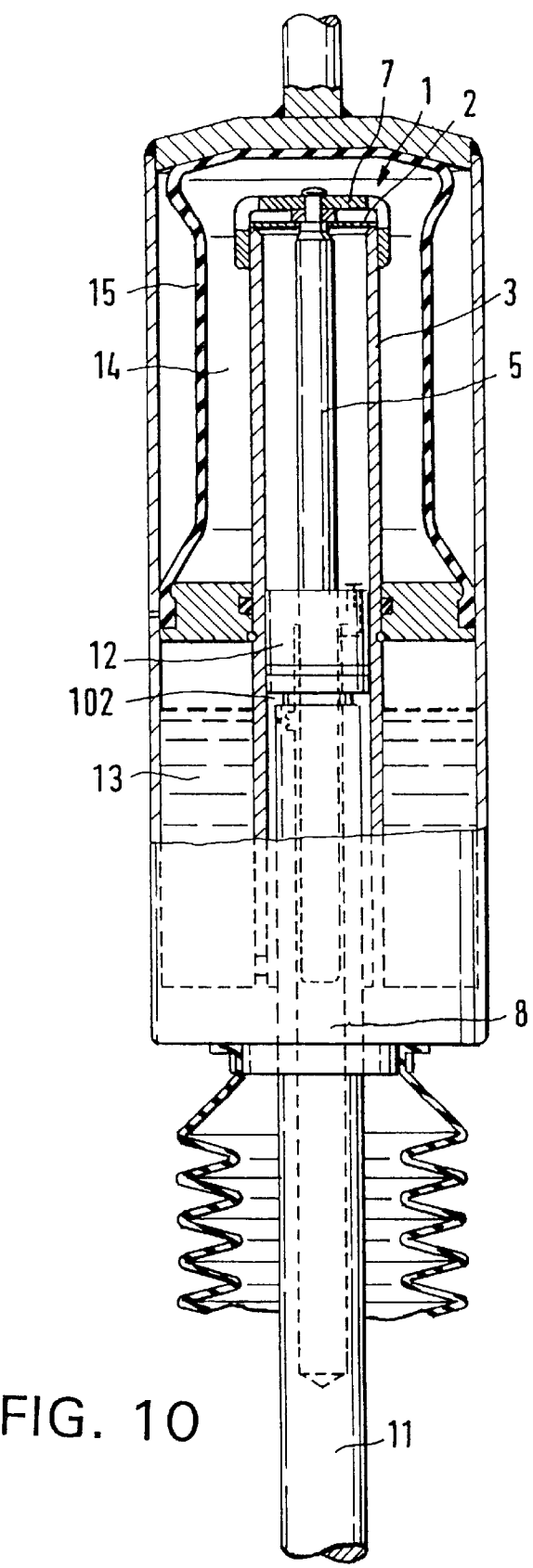
FIG. 10 shows a sectional view of another embodiment of a shock absorbing strut.

FIG. 10 illustrates an alternative embodiment of a shock absorbing strut including a non-return valve 102 to allow damping medium to return to the low pressure chamber 13 upon depressurization of the shock absorbing strut.

An alternative embodiment, illustrated in FIG. 11, includes a work cylinder 213, a piston rod 212 and a piston 206, as well as a low pressure chamber 201 and a high pressure chamber 204. The high pressure chamber 204 is divided by means of a ring-shaped separating piston 219 into a gas chamber 220 and the chamber 204 which is filled with damping medium. Between the piston rod 212 and the work cylinder 213 is a pump chamber 203 which is connected to the low pressure chamber 201 by means of a regulating device 207. There is also a non-return valve 202 which provides the flow connection between the low pressure chamber 201 and the pump chamber 203.

There can also be a flow connection to the high pressure chamber 204 from the pump chamber 203 by means of a non-return valve 205. FIG. 11 shows the shock absorbing strut in the pumping-up or pressurization or compression phase, whereby the damping medium flows out of the low pressure chamber 201 via the non-return valve 202 into the pump chamber 203. The high pressure chamber 204 which is under an initial gas pressure holds the non-return valve 205 in the closed position and pressurizes the surface of the piston 206. In the decompression stage, the non-return valve 202 closes and the damping medium from the pump chamber 203 travels via the non-return valve 205 into the high pressure chamber 204. As a result of the in-and-out movements of the piston rod 212, the damping medium is continuously pumped from the low pressure chamber 201 into the high pressure chamber 204.

In this embodiment, the regulating device 207 can include a resilient or flexible part 208 and a closing element 209, which keeps a recess or passage 211 of the work cylinder 213 closed by means of a seal element 210.

In the pumping-up phase illustrated in FIG. 11, the closing element 209, which closing element 209 is realized in the form of a permanent magnet is pressurized by the piston rod 212 and thereby closes the recess 211. The magnetic force of the permanent magnet can be selected so that the recess 211 is opened above a specified pressure in the pump chamber 203. From this time forward, the damping medium from the pump chamber 203 is no longer pumped into the high pressure chamber 204, but directly into the low pressure chamber 201. The regulating device 207 also prevents the penetration of the gas in the low pressure chamber 201 into the pump chamber 203.

In another possible embodiment, the regulating device 207 can be designed so that the regulating device 207 can unblock the passage 211 if the pressure in the pump chamber 203 exceeds a predetermined pressure. This can be done by limiting the magnetic field of the permanent magnet to a level that is only sufficient to hold the closing element 209 in the blocked position up to a certain pressure differential between the pump chamber 203 and the low pressure chamber 201. In the event the pressure differential between the low pressure chamber 201 and the pump chamber 203 passes the predetermined threshold, the passage 211 can be unblocked and the damping medium can be allowed to flow from the pump chamber 203 into the low pressure chamber 201.

FIG. 12 illustrates a possible embodiment of the shock absorbing strut, as depicted in FIG. 11, in the regulation phase. The piston rod 212, together with the piston 206, is below the recess 211, so that the permanent magnet of the regulating device 207 is no longer in the field of action of the piston rod 212. When there is a corresponding pressure in the high pressure chamber 204, the closing element 209 then opens and releases the recess 211, so that a corresponding pressure equalization can take place between the high pressure chamber 204 and the low pressure chamber 201.

In a further embodiment of the present invention, there is a work chamber 218, which is open to the high pressure chamber 204 which is aligned with the recess 211 when the piston 206 is below the recess 211.

Figure 13:
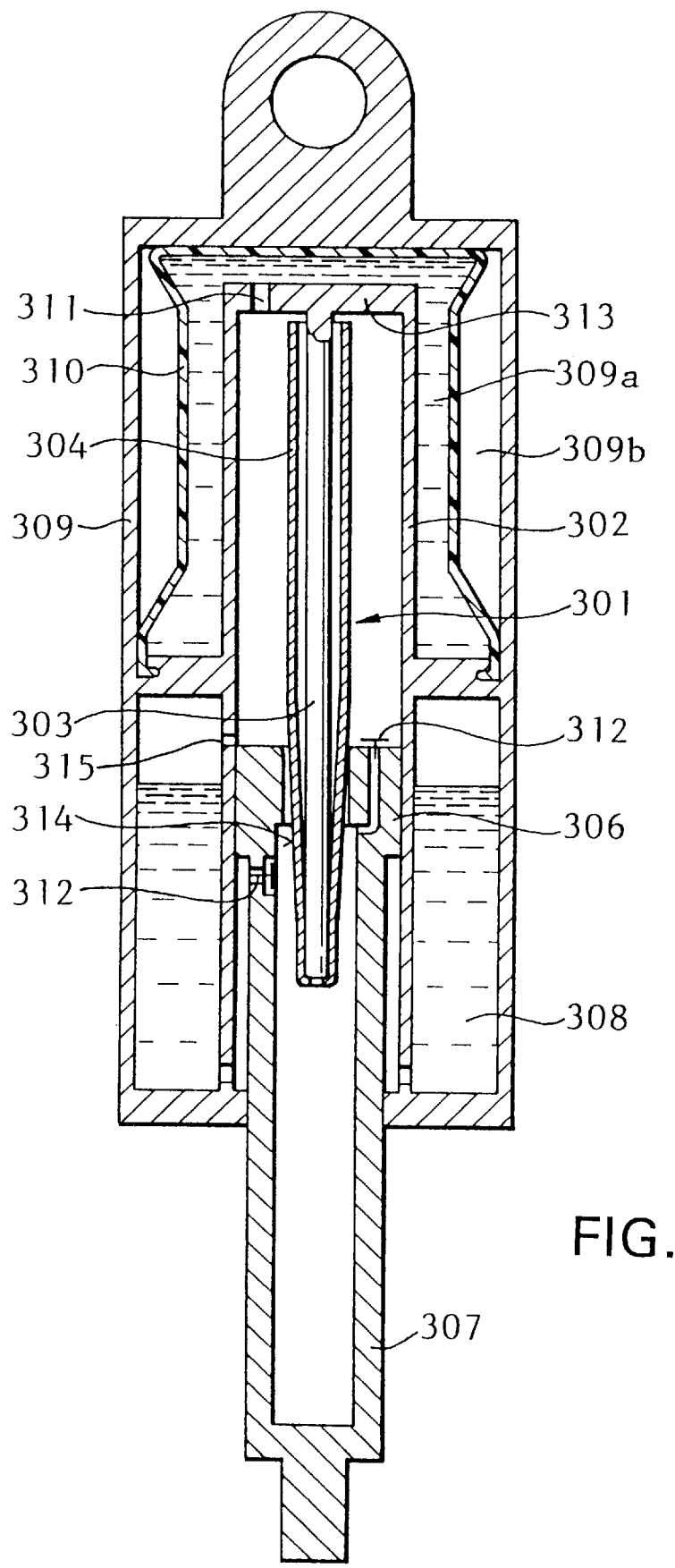
FIG. 13 shows a sectional view of another embodiment of a shock absorbing strut.

FIG. 13 illustrates yet another embodiment of a self pumping shock absorbing strut with internal level regulation for rotor vehicles which shock absorbing strut has a work cylinder 302 of the shock absorbing strut, in which a damping piston 306 on the end of a hollow piston rod 307 slides. The work cylinder 302 is closed on the one side by a base and on the other side by a cover, through which the hollow piston rod 307 extends outward in a sealed manner. The shock absorbing strut is fastened to the body of a vehicle and to the axle of a vehicle in a manner not illustrated. The work cylinder 302 is surrounded by a ring-shaped low pressure chamber 308 which is filled partly with damping medium and partly with gas, and in the opposite area, the work cylinder 302 is surrounded by a high pressure chamber 309 which is divided by means of a membrane 310 into an area 309a which is filled with damping medium and an area 309b which is filled with gas.

In the completely depressurized state, i.e. when the shock absorbing strut is not pumped up, the same pressure prevails in the low pressure chamber 308 and in the high pressure chamber 309. The work cylinder 302, by means of borings or passages 311 on the end surface 313, has a throttled and/or damped connection with the high pressure chamber 309. The damping piston 306 is provided with non-return valves 312 to control the shock absorbing strut, whereby the work cylinder 302 is provided in its end surface 313 with a pump rod 301 which consists of an inner part 303 and an outer part 304. The pump rod 301 is guided through an opening of the damping piston 306, and together with the cavity in the hollow piston rod 307 forms a pump.

The shock-absorbing strut functions as follows. When the pump rod 301 is inserted into the hollow piston rod 307, the damping medium in the cavity of the piston rod 307 is transported on account of the non-return valve 312 into the upper part of the work cylinder 302, and from there via the boring 311 pressurizes the gas cushion 309b in the high pressure chamber 309. When the piston rod 307 is extended, damping medium once again flows, controlled by the non-return valve 312, out of the low pressure chamber 308 via corresponding openings into the cavity of the hollow piston rod 307. After reaching the desired level, any further pumping action is neutralized by the conical area 314 of the pump rod 301. The flow passage 315 allows for return flow of damping medium from the work cylinder 302 to the low pressure chamber 308.

One feature of the invention resides broadly in the self-pumping hydropneumatic shock absorbing strut with internal level regulation, in particular for motor vehicles, with a work cylinder which is filled with oil, is under the pressure of at least one gas cushion which is located in a corresponding at least one high pressure chamber and acts as a spring, which work cylinder is divided by a piston carried on a hollow piston rod into two work chambers, with a piston pump which is driven by the spring movements and transports oil from a low pressure chamber into the work chamber which is connected to the high pressure chamber, and the pump cylinder of the piston pump is formed by the hollow piston rod, whereby there are valves between the work chamber and the high pressure chamber for the decompression and compression damping, characterized by the fact that as a valve 1 there is at least one valve plate 2 which interacts with a valve seat 4 which is located on the work cylinder 3.

Another feature of the invention resides broadly in the shock absorbing strut characterized by the fact that the valve plate 2 is supported radially inwardly on a second valve seat 6 which is located on a pump rod 5.

Yet another feature of the invention resides broadly in the shock absorbing strut characterized by the fact that the valve plate 2 is supported radially inwardly on a retaining element 7 which is connected to the work cylinder 3 and straddles or bridges the work cylinder 3.

Still another feature of the invention resides broadly in the shock absorbing strut characterized by the fact that a pump rod 5 which is inserted into the pump cylinder 8 is fixed in position by means of a retaining element which is connected with the work cylinder 3 and straddles the work cylinder 3.

A further feature of the invention resides broadly in the shock absorbing strut characterized by the fact that the retaining element 7 is provided with recesses 9.

Another feature of the invention resides broadly in the shock absorbing strut characterized by the fact that the valve seat 4 is formed on the end surface of the work cylinder 3.

Yet another feature of the invention resides broadly in the shock absorbing strut characterized by the fact that the valve plates 2 can be biased by means of a bracing element 10.

Still another feature of the invention resides broadly in the shock absorbing strut characterized by the fact that the valve seat 4 and the second valve seat 6, 6a are each realized for a single direction of flow.

The following U.S. patent applications: Ser. No. 08/761,358, attorney docket no. NHL-FIS-236, corresponding to Federal Republic of Germany Patent Application no. 195 45 661.0, having inventor Hubert Beck and filed in the Federal Republic of Germany on Dec. 7, 1995; Ser. No. 08/760,882, attorney docket no. NHL-FIS-237, corresponding to Federal Republic of Germany Patent Application no. 195 45 662.9-21, having inventor Hubert Beck and filed in the Federal Republic of Germany on Dec. 7, 1995; and Ser. No. 08/769,663, attorney docket no. NHL-FIS-235, corresponding to Federal Republic of Germany Patent Application no. 195 47 536.4, having the inventor Hubert Beck and filed in the Federal Republic of Germany on Dec. 20, 1995.

All of the patents, patent applications and publications recited herein are hereby incorporated by reference as if set forth in their entirety herein.

The corresponding foreign patent publication applications, namely, Federal Republic of Germany Patent Application No. 195 47 535.6-12, filed on Dec. 20, 1995, having inventor Hubert Beck, and DE-OS 195 47 535.6-12 and DE-PS 195 47 5535.6-12, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

The invention as described hereinabove in the context of the preferred embodiments is not to be taken as limited to all of the provided details thereof, since modifications and variations thereof may be made without departing from the spirit and scope of the invention.

What is claimed is:

1. A self-pumping hydropneumatic shock absorbing strut with internal level regulation for a motor vehicle, said shock absorbing strut comprising:
    a work cylinder having a first end and a second end and defining a longitudinal axis;
    a hollow piston rod;
    a piston mounted on said hollow piston rod;
    said piston being disposed for movement within said work cylinder;
    damping medium disposed in said work cylinder, for damping movement of said piston;
    said piston being disposed within said work cylinder to form a work chamber between said first end of said work cylinder and said piston;
    another chamber for holding damping medium;
    a valve disposed between said work chamber and said another chamber;
    said valve comprising:
        at least one valve plate;
        at least one valve seat; and
        said at least one valve seat being disposed at said work cylinder;
    an arrangement to self-pump said shock absorbing strut;
    an arrangement disposed within said shock absorbing strut to regulate the level of said shock absorbing strut;
    a retaining element;
    said retaining element being disposed adjacent said first end of said work cylinder;
    said retaining element comprising a plurality of flow passages;
    said plurality of flow passages being disposed and configured to permit flow of damping fluid between said work chamber and said another chamber;
    said at least one valve seat being configured to permit flow of damping medium in a first flow direction;
    said retaining element comprising a first portion;
    said first portion of said retaining element being disposed substantially in the axial direction;
    said shock absorbing strut comprising one of a) and b):
        a) a weld to connect said first portion of said retaining element to said work cylinder; and
        b) said work cylinder comprising a threaded portion; and
        said first portion of said retaining element comprising a threaded portion; and
        said threaded portion of said retaining element being disposed and configured to connect said retaining element to said threaded portion of said work cylinder.

2. The shock absorbing strut according to claim 1 wherein:
    said first end of said work cylinder comprises an end surface; and
    said at least one valve seat is disposed on said end surface of said first end of said work cylinder.

3. The shock absorbing strut according to claim 2 comprising:
    a membrane;
    said membrane being disposed in said another chamber;
    said membrane being disposed to separate said another chamber into a high pressure chamber and a gas cushion; and
    said gas cushion being disposed about said high pressure chamber.

4. The shock absorbing strut according to claim 3 comprising:
    a pump rod having first and second ends;
    said first end of said pump rod being disposed adjacent said first end of said work cylinder;
    said valve comprising a second valve seat; and
    said second valve seat being disposed on said pump rod.

5. The shock absorbing strut according to claim 4 wherein said second valve seat is configured to permit flow of damping medium in a second flow direction, opposite from said first flow direction.

6. The shock absorbing strut according to claim 5 wherein:
    said retaining element comprises a hole disposed therethrough; and
    said pump rod being disposed through said hole in said retaining element.

7. The shock absorbing strut according to claim 6 wherein:
   said hollow piston rod comprises a pump chamber disposed therein; and
   said second end of said pump rod is disposed through said piston and extends into said pump chamber.

8. The shock absorbing strut according to claim 7 wherein:
   said at least one valve plate comprises a portion;
   said portion being disposed adjacent said pump rod; and
   said second valve seat is disposed adjacent said portion of said at least one valve plate to support said at least one valve plate.

9. The shock absorbing strut according to claim 8 comprising:
   an outer cylinder;
   said outer cylinder being disposed about said work cylinder and being disposed a distance from said work cylinder;
   said retaining element comprising a second portion;
   said second portion of said retaining element being disposed to extend radially outward from said first portion of said retaining element;
   said second portion of said retaining element having an outer periphery; and
   said outer periphery of said second portion being disposed against said outer cylinder and being connected to said outer cylinder.

10. The shock absorbing strut according to claim 9 comprising:
    a structure to fasten said pump rod to said retaining element;
    said fastening structure being configured and disposed to provide play between said pump rod and said retaining element to minimize said pump rod from making frictional contact with said hollow piston rod;
    said fastening structure being configured and disposed to allow said pump rod to move at least one of radially, axially and angularly with respect to said retaining element;
    said fastening structure comprises a biasing structure to elastically bias said pump rod with respect to said retaining element;
    said biasing structure comprising at least one elastic washer;
    said at least one elastic washer being disposed adjacent to said retaining element;
    said fastening structure comprising a journal;
    said retaining element comprising a hole disposed therethrough;
    said journal being disposed through said hole in said retaining element;
    said journal being disposed to fasten said pump rod to said retaining element;
    said retaining element comprises a recess to receive said pump rod;
    said recess being disposed substantially along the longitudinal axis;
    said recess being disposed about a portion of said hole through said retaining element;
    said pump rod having an outer diameter, said outer diameter being substantially transverse to the longitudinal axis;
    said recess having a conical shape;
    said recess having a diameter;
    said hole through said retaining element having a diameter;
    said diameter of said recess being greater than said diameter of said hole through said retaining element;
    said diameter of said recess being greater than said outer diameter of said pump rod;
    a structure to connect said journal to said pump rod comprising one of c), d) and e):
       c) said journal comprising a threaded portion;
       said pump rod comprising a threaded opening to receive said threaded portion; and
       said threaded portion of said journal being screwed into said pump rod;
       d) said journal comprising an integral extension of said pump rod; and
       e) said journal comprising a recessed portion;
       said pump rod comprising a projection disposed adjacent said recessed portion;
       said journal being fastened to said pump rod by said recessed portion and said projection; and
    said at least one elastic washer being disposed to pressurize said passage through said retaining element.

11. The shock absorbing strut according to claim 3 wherein:
    said retaining element comprises a second portion;
    said second portion of said retaining element is disposed to extend toward said at least one valve plate;
    said second portion comprises a substantially flat surface;
    said substantially flat surface of said second portion is disposed substantially transverse to the longitudinal axis; and
    said substantially flat surface comprises a second at least one valve seat.

12. The shock absorbing strut according to claim 11 wherein:
    said at least one valve plate comprises a portion;
    the longitudinal axis is a central axis;
    said portion being disposed adjacent the central axis; and
    said second at least one valve seat is disposed adjacent said portion of said at least one valve plate to support said at least one valve plate.

13. The shock absorbing strut according to claim 3 comprising:
    said retaining element comprising a hole disposed therethrough;
    a biasing element to bias said at least one valve plate with respect to said retaining element;
    said biasing element comprising a first portion and a second portion;
    said first portion of said biasing element having a substantially flat surface;
    said substantially flat surface being disposed adjacent said at least one valve plate;
    said second portion of said biasing element being disposed through said hole in said retaining element to attach said biasing element to said retaining element; and
    said substantially flat surface of said first portion of said biasing element comprising a second at least one valve seat.

14. The shock absorbing strut according to claim 13 wherein:

said at least one valve plate comprises a portion;

said portion being disposed adjacent the longitudinal axis; and said second at least one valve seat is disposed adjacent said portion of said at least one valve plate to support said at least one valve plate.

* * * * *

UNITED STATES PATENT AND TRADEMARK OFFICE
CERTIFICATE OF CORRECTION

| | | |
|---|---|---|
| PATENT NO. | : | 5,857,665 |
| DATED | : | January 12, 1999 |
| INVENTOR(S) | : | Hubert BECK |

It is certified that error appears in the above-identified patent and that said Letters Patent is hereby corrected as shown below:

In Column 7, line 54, after 'and', delete "DE-PS 195 47 5535.6-12," and substitute therefor --DE-PS 195 47 535.6-12,--.

Signed and Sealed this

Second Day of November, 1999

Attest:

Q. TODD DICKINSON

*Attesting Officer*  Acting Commissioner of Patents and Trademarks